United States Patent
Zhai (10) Patent No.: US 12,224,883 B2
(45) Date of Patent: Feb. 11, 2025

(54) NETWORK CONFIGURATION METHOD, TERMINAL, SYSTEM, AND STORAGE MEDIUM

(71) Applicant: ZTE CORPORATION, Shenzhen (CN)

(72) Inventor: Jingliang Zhai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 254 days.

(21) Appl. No.: 17/995,490

(22) PCT Filed: Aug. 2, 2021

(86) PCT No.: PCT/CN2021/110087
§ 371 (c)(1),
(2) Date: Oct. 5, 2022

(87) PCT Pub. No.: WO2022/057477
PCT Pub. Date: Mar. 24, 2022

(65) Prior Publication Data
US 2023/0179444 A1    Jun. 8, 2023

(30) Foreign Application Priority Data

Sep. 18, 2020   (CN) .......................... 202010989901.3

(51) Int. Cl.
*H04L 12/46*    (2006.01)
*H04L 41/084*   (2022.01)

(52) U.S. Cl.
CPC ...... *H04L 12/4675* (2013.01); *H04L 41/0846* (2013.01)

(58) Field of Classification Search
CPC ............. H04L 12/4675; H04L 41/0846; H04L 12/4641; H04L 41/0853; H04L 41/0895; H04L 41/0806; H04L 41/0886
See application file for complete search history.

(56) References Cited

U.S. PATENT DOCUMENTS

| 2015/0280992 A1* | 10/2015 | Wang ................. H04L 41/0886 370/254 |
| 2015/0333927 A1 | 11/2015 | Palazzolo |
| 2018/0367416 A1* | 12/2018 | Nagarajan ........... H04L 41/0853 |

FOREIGN PATENT DOCUMENTS

| CN | 101631062 A | 1/2010 |
| CN | 103078770 A | 5/2013 |

(Continued)

OTHER PUBLICATIONS

3GPP System Architecture and Services. "VLAN Information configuration and information exchange," 3GPP SA WG2 Meeting S2 #137E, Feb. 2020, pp. 1-4.

(Continued)

*Primary Examiner* — Brian Whipple
(74) *Attorney, Agent, or Firm* — Vivacqua Crane, PLLC (57) ABSTRACT

A network configuration method, a terminal device, a system and a non-transitory computer-readable storage medium are disclosed. The network configuration method may include: receiving first configuration information from a first device; setting VLAN information of a second device according to the first configuration information, and generating second configuration information according to the VLAN information; and establishing a communication connection with the first device by means of an untagged port.

16 Claims, 8 Drawing Sheets

(56) References Cited

FOREIGN PATENT DOCUMENTS

| | | |
|---|---|---|
| CN | 103812752 A | 5/2014 |
| CN | 103873374 A | 6/2014 |
| CN | 111614566 A | 9/2020 |
| EP | 1509013 A2 | 2/2005 |
| WO | 2018059503 A1 | 4/2018 |

OTHER PUBLICATIONS

European Patent Office. Extended European Search Report for EP Application No. 21868306.8, mailed Sep. 27, 2023, pp. 1-12.
International Searching Authority. International Search Report and Written Opinion for PCT Application No. PCT/CN2021/110087 and English translation, mailed Nov. 3, 2021, pp. 1-9.

* cited by examiner

NETWORK CONFIGURATION METHOD, TERMINAL, SYSTEM, AND STORAGE MEDIUM

CROSS-REFERENCE TO RELATED APPLICATION

This application is a national stage filing under 35 U. S.C. § 371 of international application number PCT/CN2021/110087, filed Aug. 2, 2021, which claims priority to Chinese patent application No. 202010989901.3, filed Sep. 18, 2020. The contents of these applications are incorporated herein by reference in their entirety.

TECHNICAL FIELD

The present disclosure relates to Virtual Local Area Networks (VLAN), and in particular, to a network configuration method and system, a terminal device, and a non-transitory computer-readable storage medium.

BACKGROUND

VLAN is a broadcast domain segmentation technology based on Layer 2 switches. Applied VLANs may be grouped according to locations, functions, departments of network users or according to application programs and protocols used by the network users, so as to improve the freedom of network design. According to the 802.1Q protocol (dot1q) issued by the Institute of Electrical and Electronics Engineers (IEEE), multiple Bridges are allowed to share the same entity network publicly without leakage of information.

With the continuous development of wireless technology and improvement of wireless network data rate, intelligent devices are becoming more and more popular. Due to the increasing number of access devices, VLANs are becoming more and more popular because of characteristics of network segmentation according to user needs without being restricted by physical locations of network users.

At present, a VLAN realizes the access and switching of an access device through a VLAN Identity Document (ID) in a VLAN tagging. The access device needs to monitor information of a VLAN ID in each data message, which will occupy resources of the device and thus affect the performance of the device. A large number of messages need to be sent in a VLAN system, which reduces the stability of the VLAN system.

SUMMARY

The following is an overview of the subject described in detail herein. This overview is not intended to limit the scope of protection of the appended claims.

Embodiments of the present disclosure provide a network configuration method and system, a terminal device, and a non-transitory computer-readable storage medium In accordance with an aspect of the present disclosure, an embodiment provides a network configuration method for communicatively connecting a second device to a first device. The method may include: acquiring first configuration information of a VLAN; sending the first configuration information to the second device; and establishing a communication connection with the second device by means of an untagged interface.

In accordance with another aspect of the present disclosure, an embodiment provides a network configuration method for communicatively connecting a second device to a first device. The method may include: acquiring first configuration information from the first device; setting VLAN information of the second device according to the first configuration information, and generating second configuration information according to the VLAN information of the second device; and establishing a communication connection with the first device by means of an untagged link.

In accordance with yet another aspect of the present disclosure, an embodiment provides a network configuration method for communicatively connecting a second device to a first device. The method may include: acquiring, by the first device, first configuration information of a VLAN; sending, by the first device, the first configuration information to the second device; setting, by the second device, VLAN information of the second device according to the first configuration information; generating, by the second device, second configuration information according to the VLAN information of the second device; sending, by the second device, the second configuration information to the first device; and establishing a communication connection between the first device and the second device by means of an untagged port.

In accordance with still another aspect of the present disclosure, an embodiment provides a terminal device, communicatively connected to a second terminal device. The terminal device may include: an information acquisition module configured to acquire first configuration information of a VLAN; an information sending module configured to send the first configuration information to a second device; and a communication module configured to establish a communication connection with the second terminal device by means of an untagged interface.

In accordance with still another aspect of the present disclosure, an embodiment provides a terminal device, communicatively connected to a first terminal device. The terminal device may include: an information acquisition module configured to acquire first configuration information of a VLAN from the first terminal device; a network configuration module configured to set VLAN information according to the first configuration information and generate second configuration information according to the VLAN information; and a communication module configured to establish a communication connection with the first terminal device by means of an untagged interface.

In accordance with still another aspect of the present disclosure, an embodiment provides a network configuration system. The system may include: at least one first terminal device according to the terminal device communicatively connected to a second terminal device; and at least one second terminal device according to the terminal device communicatively connected to the first terminal device, where the first terminal device is in communicatively connected to the second terminal device.

In accordance with still another aspect of the present disclosure, an embodiment provides a non-transitory computer-readable storage medium, storing one or more programs which, when executed by one or more processors, cause the one or more processors to implement the network configuration method applicable to the first device; or the network configuration method applicable to the second device; or the network configuration method applicable to the first device and the second device.

Other features and advantages of the present disclosure will be set forth in the following description, and partly become apparent from the description, or understood by implementing the present disclosure. The objects and other

REFERENCE NUMERALS

Internet 100; Network Access Device 200; User Access Device 300; First Access Device 401; Second Access Device 402; Third Access Device 403.

DETAILED DESCRIPTION

In order to make the objects, technical schemes and advantages of the present disclosure clear, the present disclosure will be further described in detail with reference to the drawings and embodiments. It should be understood that the specific embodiments described here are only used to illustrate the present disclosure, and are not used to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the appended claims, and the accompanying drawings are used to distinguish similar objects, and are not necessarily used to describe a specific sequence or a precedence order.

A Local Area Network (LAN) may be a network composed of a few home computers or an enterprise network composed of hundreds of computers. The LAN referred to in a VLAN specifically refers to a network segmented by a router, that is, a broadcast domain. The broadcast domain refers to a range to which broadcast frames (all target MAC addresses are 1) can be delivered, that is, a range to which direct communication can be performed. A Layer 2 switch can only build a single broadcast domain, but can divide a network into multiple broadcast domains after utilizing a VLAN function. If there is only one broadcast domain, after receiving the broadcast frame, the switch may forward the broadcast frame to all ports except a receiving port. In this case, there may be only one port that needs to acquire the broadcast information, but the data frame is spread all over the network at this time. Therefore, the broadcast information consumes the overall bandwidth of the network, and the computer that receives the broadcast information also consumes some CPU time to process the broadcast information, resulting in a large amount of unnecessary consumption of network bandwidth and CPU computing power. An applied VLAN is segmented into multiple broadcast domains, so that the overall transmission performance of the network can be improved.

At present, for the applied VLAN, VLAN configuration is performed utilizing a tagged data frame. A change in a tagged message structure is that VLAN information of 4bytes, that is, a VLAN tag Header, is added behind a source mac address and a destination mac address. Such a message needs to be received by a specific device, which will increase the requirements for a VLAN device and increase the complexity of a system.

The technical schemes of the present disclosure will be clearly and completely described below with reference to the drawings. Obviously, the embodiments described below are a part of the embodiments of the present disclosure, but not all of the embodiments.

Figure 1:
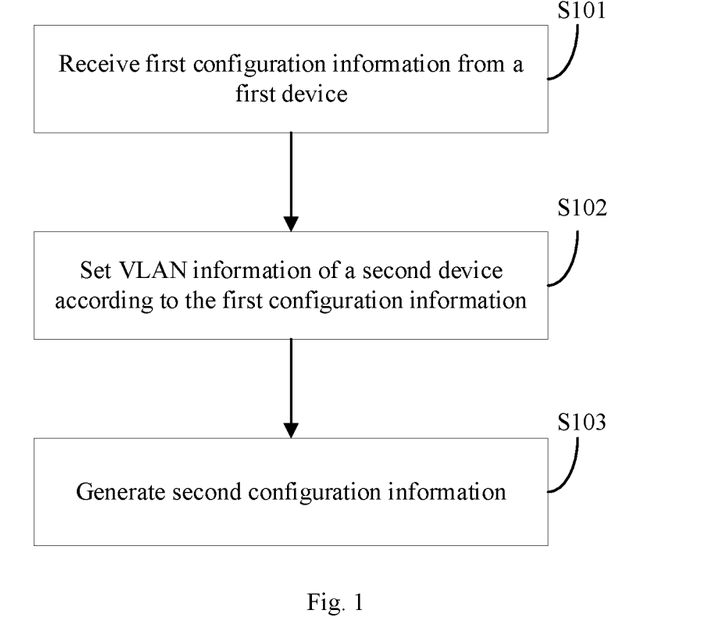
FIG. 1 is a flowchart of a network configuration method provided by an embodiment of the present disclosure.

FIG. 1 is a flowchart of a network configuration method provided by an embodiment of the present disclosure. The network configuration method shown in FIG. 1 at least includes following steps: S101, receiving first configuration information from a first device; S102, setting VLAN information of a second device according to the first configuration information; and S103, generating second configuration information.

At S101, first configuration information from a first device is received.

In some embodiments, a second device receives the first configuration information from the first device. The first configuration information includes VLAN information.

At S102, VLAN information of the second device is set according to the first configuration information.

In some embodiments, the second device sets VLAN information of the second device according to the first configuration information.

At S103, second configuration information is generated.

In some embodiments, the second device generates second configuration information according to the VLAN information of the second device.

In some embodiments, the first configuration information includes at least one of: VLAN ID, Internet Protocol (IP) subnet information, Access Point Name (APN) information or port type information.

In some embodiments, a mode of acquiring the first configuration information from the first device includes at least one of receiving a Socket or receiving a file.

In some embodiments, the network configuration method further includes: sending second configuration information to the first device, where the second configuration information includes at least one of VLAN ID, IP subnet information or APN information.

Figure 2:
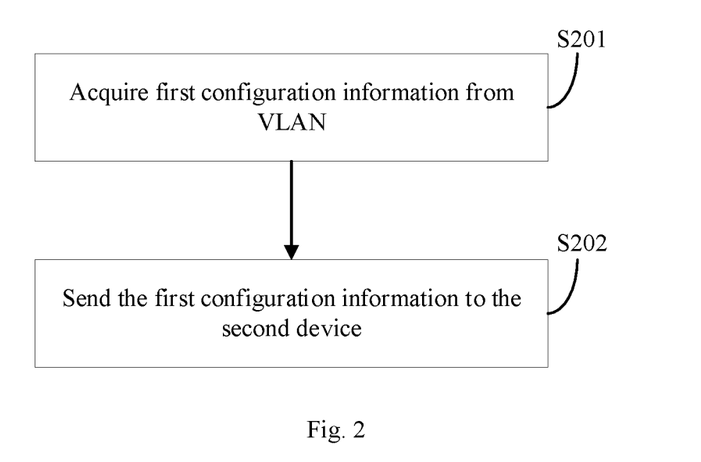
FIG. 2 is a flowchart of a network configuration method provided by another embodiment of the present disclosure.

FIG. 2 is a flowchart of a network configuration method provided by another embodiment of the present disclosure. The network configuration method shown in FIG. 2 at least includes following steps: S201, acquiring first configuration information from VLAN information; and S202, sending the first configuration information to the second device.

At S201, first configuration information from VLAN information is acquired.

In some embodiments, the first device acquires first configuration information from VLAN information.

At S202, the first configuration information is sent to the second device.

In some embodiments, the first device sends the first configuration information to the second device.

In some embodiments, the first configuration information includes at least one of: VLAN ID, IP subnet information, APN information or port type information.

In some embodiments, a mode of sending the first configuration information to the second device includes at least one of sending a Socket and sending a file.

In some embodiments, the network configuration method further includes: acquiring second configuration information from the second device.

In some embodiments, the network configuration method further includes: detecting whether the first configuration information conflicts with the second configuration information according to the second configuration information; if not, ending the process; otherwise, performing a collision avoidance process.

In some embodiments, the collision avoidance process includes: resetting a subnet address; and reconfiguring a subnet of the first device.

Figure 3:
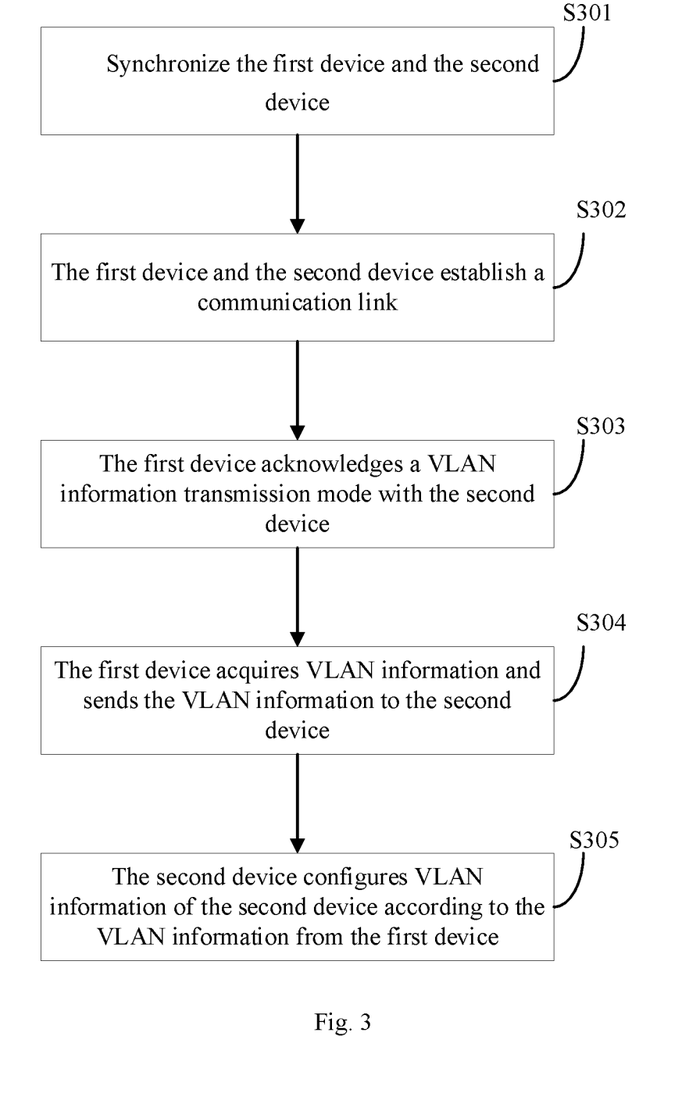
FIG. 3 is a flowchart of a network configuration method provided by another embodiment of the present disclosure.

FIG. 3 is a flowchart of a network configuration method provided by another embodiment of the present disclosure. The network configuration method shown in FIG. 3 at least includes following steps: S301, synchronizing the first device and the second device; S302, establishing, by the first device and the second device, a communication link; S303, acknowledging, by the first device and the second device, a VLAN information transmission mode; S304, acquiring, by the first device, VLAN information and sending the VLAN information to the second device; and S305, configuring, by the second device, VLAN information of the second device according to the VLAN information.

At S301, the first device and the second device are synchronized.

In some embodiments, a VLAN synchronization mode of the first device and the second device is set and corresponding ports are connected. A device of which VLAN configuration is completed, as a sender of VLAN configuration information, is set as the first device; and a receiver of VLAN information is set as the second device. The first device and the second device are only named during the configuration of the VLAN information.

At S302, the first device and the second device establish a communication link.

In some embodiments, the first device and the second device establish a communication link. A DHCP mode may be adopted for connection. The first device and the second device start DHCPD and DHCPC processes respectively. When a network cable is adopted to connect two network ports which are connected when the two devices are normally utilized, the first device and the second device establish a communication link by means of a default untagged link through the DHCP mode. When the communication link is established, the second device detects a subnet of the first device and a subnet of the second device. If a collision is detected, further collision avoidance processing is required.

At S303, the first device acknowledges a VLAN information transmission mode with the second device.

In some embodiment, the first device acknowledges a VLAN information transmission mode with the second device. The VLAN information includes: VLAN ID, IP subnet information corresponding to a network card, binding APN information and port type (Route/Bridge). The VLAN information transmission mode includes transmitting the VLAN information in a form of a Socket or a file.

At S304, the first device acquires VLAN information and sends the VLAN information to the second device.

In some embodiments, the first device acquires VLAN information and sends the VLAN information to the second device. The first device collects VLAN configuration information of a corresponding network port, and sends the VLAN configuration information to the second device in a form of negotiation between the first device and the second device. A network port of the first device for collecting VLAN information is a network port of a currently connected device. The configuration process of the VLAN information includes configuring information according to a VLAN of a port corresponding to the network port, and scanning address and routing information related to a logical network port corresponding to the VLAN.

At S305, the second device configures VLAN information of the second device according to the VLAN information.

In some embodiments, the second device configures VLAN information of the second device according to the VLAN information. The configuration of the VLAN includes: establishing a logical network card of the VLAN, configuring an IP address of the logical network card, and establishing an uplink APN link and adding routes.

Figure 4:
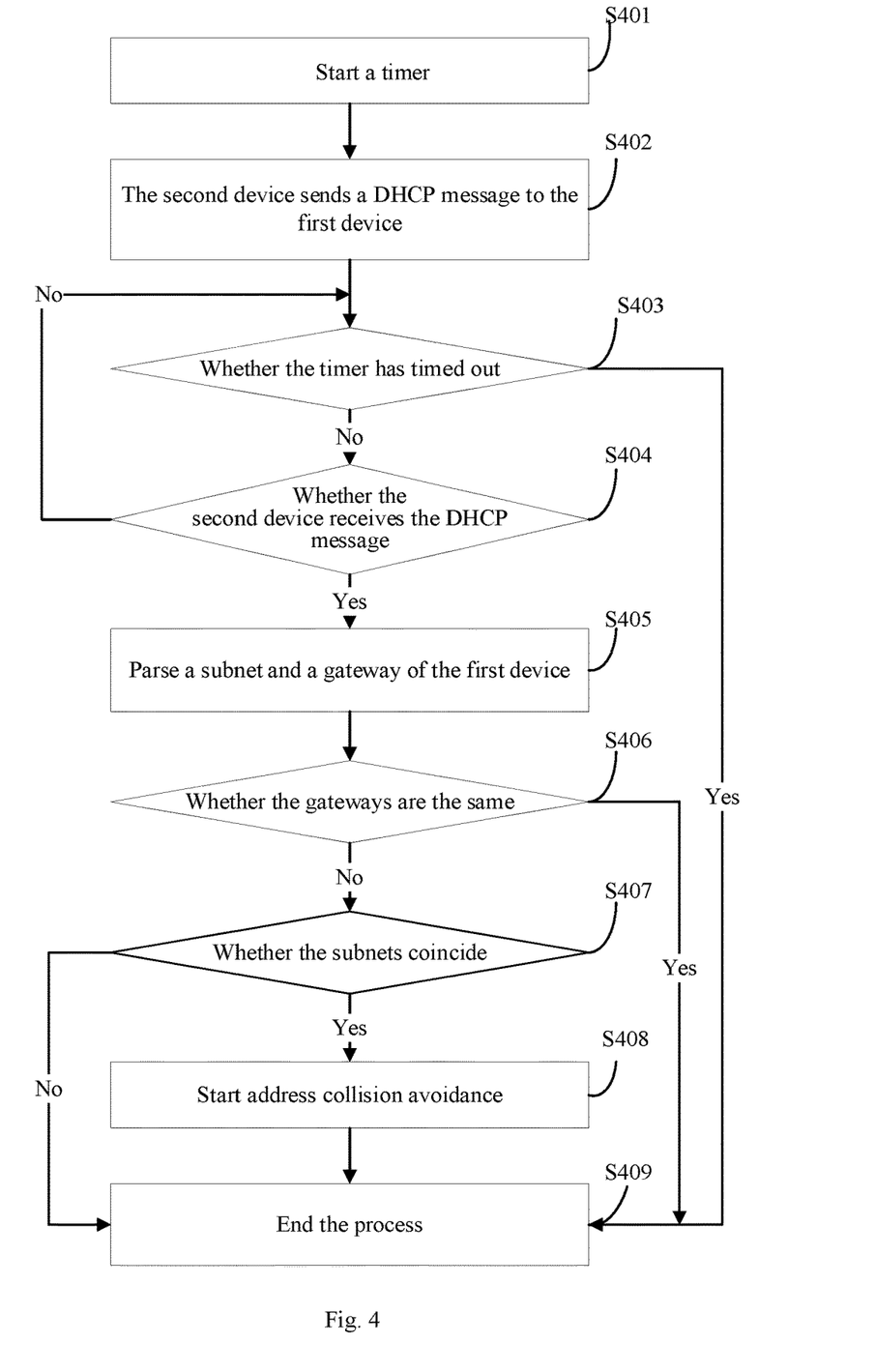
FIG. 4 is a flowchart of a collision detection method provided by an embodiment of the present disclosure.

FIG. 4 is a flowchart of a collision detection method provided by an embodiment of the present disclosure. The collision detection method shown in FIG. 4 at least includes following steps: S401, starting a timer; S402, sending, by the second device, a DHCP message to the first device; S403, detecting whether the timer has timed out; S404, detecting whether the second device receives the DHCP message; S405, parsing a subnet and a gateway of the first device; S406, detecting whether the gateways are the same; S407, detecting whether the subnets coincide; S408, starting address collision avoidance; and S409, ending the process.

At S401, a timer is started.

In some embodiments, the collision detection method is based on timing detection.

At S402, the second device sends a DHCP message to the first device.

In some embodiments, the second device sends a DHCP Discovery message to the first device to request the allocation of an IP address.

At S403, whether the timer has timed out is detected.

In some embodiments, a detection is made as to whether the timer has timed out, if not, S405 is erformed; otherwise, S409 is performed.

At S404, whether the second device receives the DHCP message is detected.

In some embodiments, a detection is made as to whether the second device receives a DHCP Offer message sent by the first device, if yes, S405 is performed; otherwise, the process goes back to S402, and a DHCP Discovery request message is continued to be sent.

At S405, a subnet and a gateway of the first device are parsed.

In some embodiments, the second device parses gateway and subnet address information of the first device from the received DHCP Offer message.

At S406, whether gateways are the same is detected.

In some embodiments, the second device detects whether device gateway address of the second device is the same as a gateway address of the first device, if so, S408 is performed; otherwise, S407 is performed.

At S407, whether subnets coincide is detected.

In some embodiments, the second device detects whether subnet address of the second device coincides with a subnet address of the first device, if so, S408 is performed; otherwise, S409 is performed.

At S408, address collision avoidance is started.

In some embodiments, address collision avoidance is started, and gateway and subnet address configuration of the second device is modified.

At S409, the process is ended.

In some embodiments, the collision detection process is ended.

Figure 5:
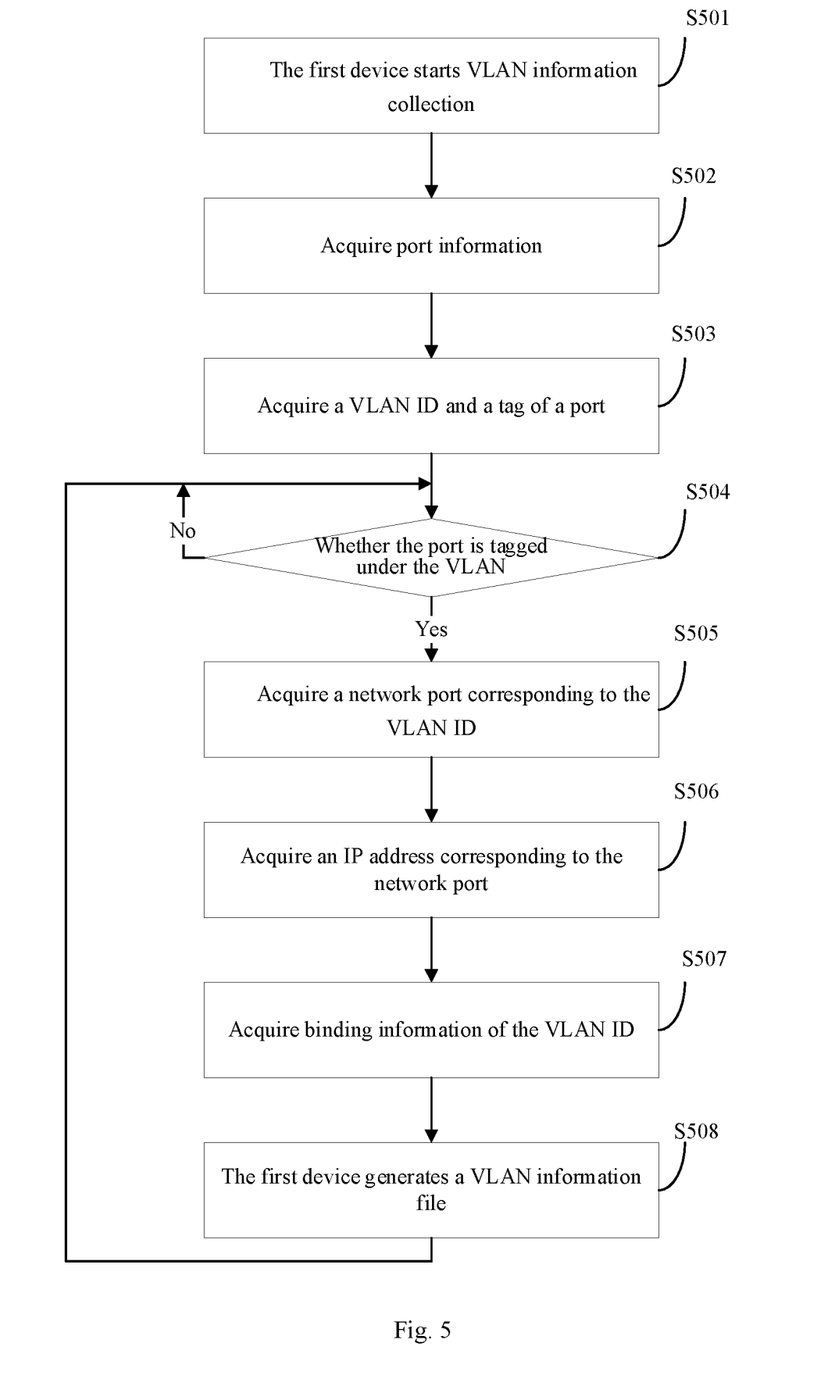
FIG. 5 is a flowchart of an information collection method provided by an embodiment of the present disclosure.

FIG. 5 is a flowchart of an information collection method provided by an embodiment of the present disclosure. The information collection method shown in FIG. 5 at least includes following steps: S501, starting, by the first device, VLAN information collection; S502, acquiring port information; S503, acquiring a VLAN ID and a tag of a port; S504, determining whether the port is tagged under the VLAN; S505, acquiring a network port corresponding to the VLAN ID; S506, acquiring an IP address corresponding to the network port; S507, acquiring binding information of the VLAN ID; and S508, generating, by the first device, a VLAN information file.

At S501, the first device starts VLAN information collection.

In some embodiments, the first device starts VLAN information collection.

At S502, port information is acquired.

In some embodiments, the first device acquires information of a port which operates normally via a network cable.

At S503, a VLAN ID and a tag of the port are acquired.

In some embodiments, the first device acquires all VLAN configuration information of the current device, and parses all VLAN ID information of the port acquired at S502 included in the VLAN configuration, and a tag state of the port in a VLAN configuration item, that is, tagged or untagged.

S504: whether the port is tagged under the VLAN is judged.

In some embodiments, the first device judges whether a port attribute of the port in the VLAN configuration information is tagged.

At S505, a network port corresponding to the VLAN ID is acquired.

In some embodiments, the first device acquires, according to the VLAN configuration information of the system, a network port name corresponding to the VLAN ID. The acquisition mode includes acquiring the network port name through information such as proc, net, vlan, and config. At S506, an IP address corresponding to the network port is acquired.

In some embodiments, a network port name is acquired by parsing an ifconfig command, or the IP address information set by the network port is acquired by other means.

At S507, binding information of the VLAN ID is acquired.

In some embodiments, binding APN information is acquired according to the VLAN ID.

At S508, the first device generates a VLAN information file.

In some embodiments, the first device generates a VLAN information file.

Figure 6:
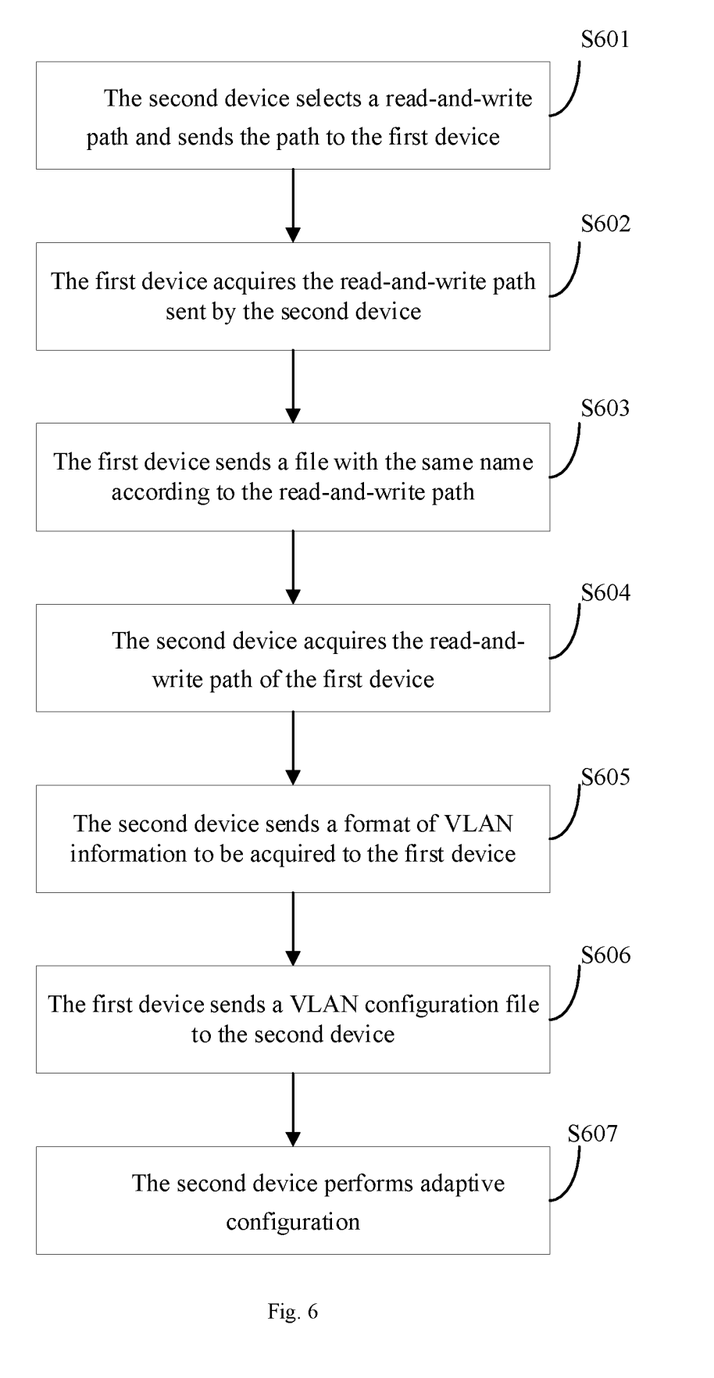
FIG. 6 is a flowchart of a network configuration information transmission method provided by an embodiment of the present disclosure.

FIG. 6 is a flowchart of a network configuration information transmission method provided by an embodiment of the present disclosure. The network configuration information transmission method shown in FIG. 6 at least includes following steps: S601, selecting, by the second device, a read-and-write path and sending the path to the first device; S602, acquiring, by the first device, the c sent by the second device; S603, sending, by the first device, a file with the same name according to the read-and-write path; S604, acquiring, by the second device, the read-and-write path of the first device; S605, sending, by the second device, a format of VLAN information to be acquired to the first device; S606, sending, by the first device, a VLAN configuration file to the second device; and S607, performing, by the second device, adaptive configuration.

At S601, the second device selects a read-and-write path and sends the path to the first device.

In some embodiments, the second device selects a writable path, writes the path and a file name expected to be received into a file with the same name, and tries to send the file to a same directory of the first device.

At S602, the first device acquires the read-and-write path sent by the second device.

In some embodiments, the first device acquires a file name that the second device expects to receive and a storage path through TFTPD process detection.

At 603, the first device sends the file with the same name according to the read-and-write path.

In some embodiments, the first device selects a writable directory, writes the directory into the file with the same name sent by the second device, and then sends the file to a directory requested by the second device.

At S604, the second device acquires the read-and-write path of the first device.

In some embodiments, the second device detects a file pushed by the first device to perform parsing, and acquires a writable directory of the first device.

At S605, the second device sends a format of VLAN information to be acquired to the first device.

In some embodiments, the second device writes a format of VLAN information to be acquired into the file with the same name of the VLAN configuration to be acquired, and sends the file to the first device.

At 606, the first device sends a VLAN configuration file to the second device.

In some embodiments, the first device acquires a VLAN configuration format file sent by the second device, parses the file, and sends the VLAN configuration file to the second device according to the file format.

At 607, the second device performs adaptive configuration.

In some embodiments, the second device receives the VLAN configuration file sent by the first device, parses the file and performs adaptive configuration. The adaptive configuration of the VLAN includes: establishing a logical network port of the VLAN, configuring an IP address of the logical network port, and establishing an uplink APN link and adding routes.

Figure 7:
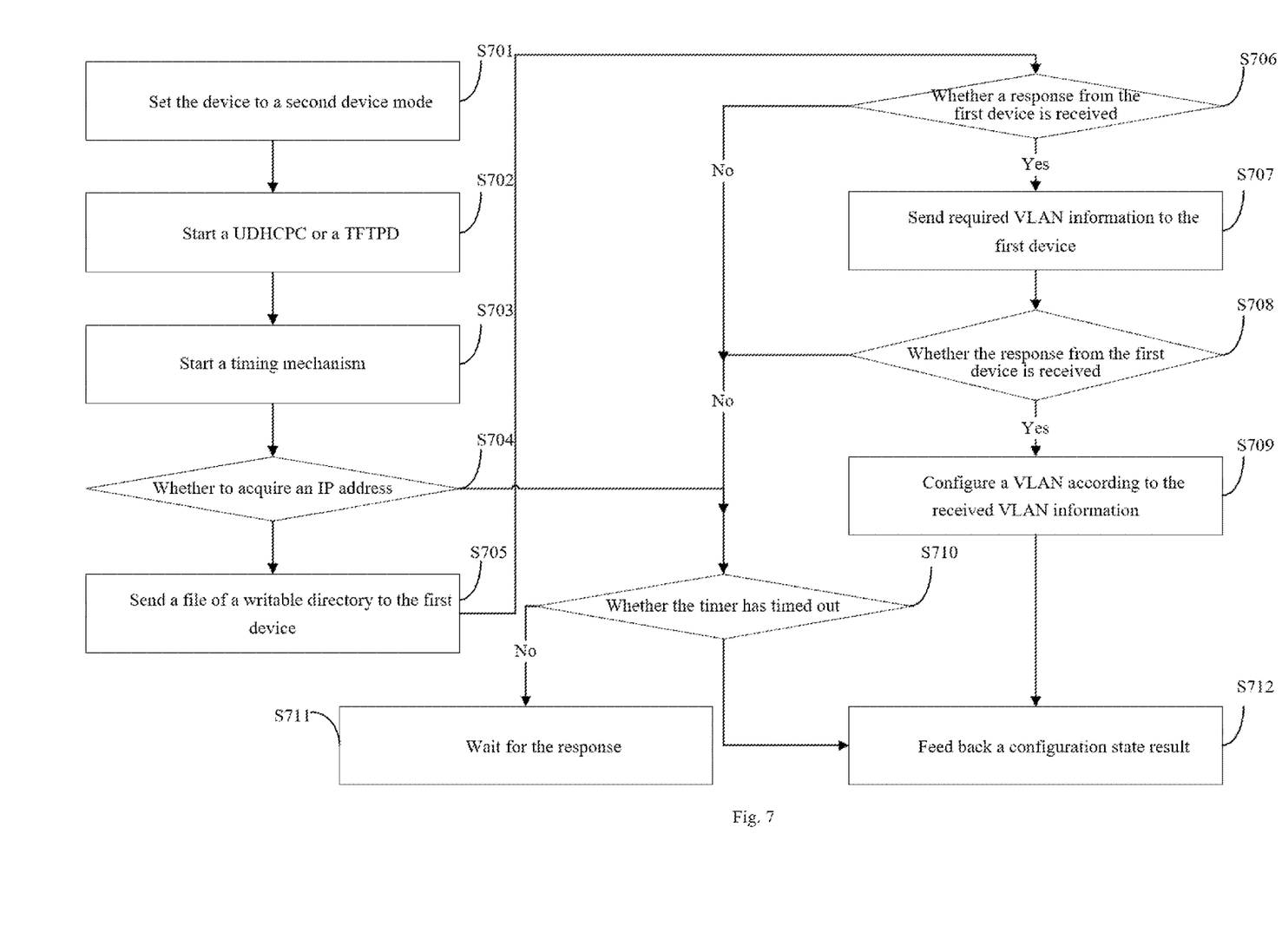
FIG. 7 is a flowchart showing operation of a second device provided by an embodiment of the present disclosure.

FIG. 7 is a flowchart showing operation of a second device provided by an embodiment of the present disclosure. The work flow of the second device shown in FIG. 7 includes at least following steps: S701, setting the device to a second device mode; S702, starting a UDHCPC or a TFTPD; S703, starting a timing mechanism; S704, determining whether to acquire an IP address; S705, sending a file of a writable directory to the first device; S706, determining whether a response from the first device is received; S707, sending required VLAN information to the first device; S708, determining whether the response from the first device is received; S709, configuring a VLAN according to the received VLAN information; S710, determining whether the timer has timed out; S711, waiting for the response; S712, feeding back a configuration state result.

At S701, the device is set to a second device mode.

In some embodiments, the device is set to a second device mode.

At S702, a UDHCPC or a TFTPD is started.

In some embodiments, the second device starts UDHCPC and TFTPD processes. The UDHCPC process is utilized for the communication connection established for assigning the IP address to the second device. An upstream access device selects a LAN port to be accessed by a downstream device in the UDHCPC process, and a downstream access device selects an upstream WAN port as a binding network card. The TFTPD process is utilized for file transfer.

At S703, a timing mechanism is started.

In some embodiments, a timing mechanism is started. The device is prevented from being in a waiting state under an abnormal condition. If the timer has timed out, information indicating VLAN information synchronization failure is fed back.

At S704, whether to acquire an IP address is judged.

In some embodiments, a judgement is made as to whether to acquire an IP address. When the second device starts the UDHCPC process and the network port is connected, a DHCP process is initiated to the first device to acquire an IP address, and a communication connection is established. If the second device receives the IP address sent by the first device, the process proceeds to S706; otherwise, the process proceeds to S705 to judge whether the timer has timed out, if not, a monitoring state is maintained.

At 705, a file of a writable directory is sent to the first device.

In some embodiments, the second device sends a file of a writable directory to the first device through a TFTP command. A file name is set to a file name that the second device expects the first device to feed back. The file includes a writable path and file name of the file that the second device expects to receive.

At 706, whether a response from the first device is received is judged.

In some embodiments, the second device judges whether corresponding information from the first device is received, if so, the process proceeds to S709; otherwise, the process proceeds to S711.

At S707, required VLAN information is sent to the first device.

In some embodiments, the second device sends required VLAN information to the first device.

At S708, whether the response from the first device is received is judged.

In some embodiments, the second device judges whether corresponding information from the first device is received, if so, the process proceeds to S709; otherwise, the process proceeds to S711.

At S709, a VLAN is configured according to the received VLAN information.

In some embodiments, the second device configures a VLAN according to the received VLAN information.

At S710, whether the timer has timed out is judged.

In some embodiments, the second device judges whether the timer has timed out, if so, the process proceeds to S712.

At S711, the response is waited.

In some embodiments, the response information fed back by the first device is waited.

At S712, a configuration state result is fed back.

In some embodiments, a configuration state result is fed back; in case of success, a successful configuration is fed back; otherwise, a failed configuration is fed back.

Figure 8:
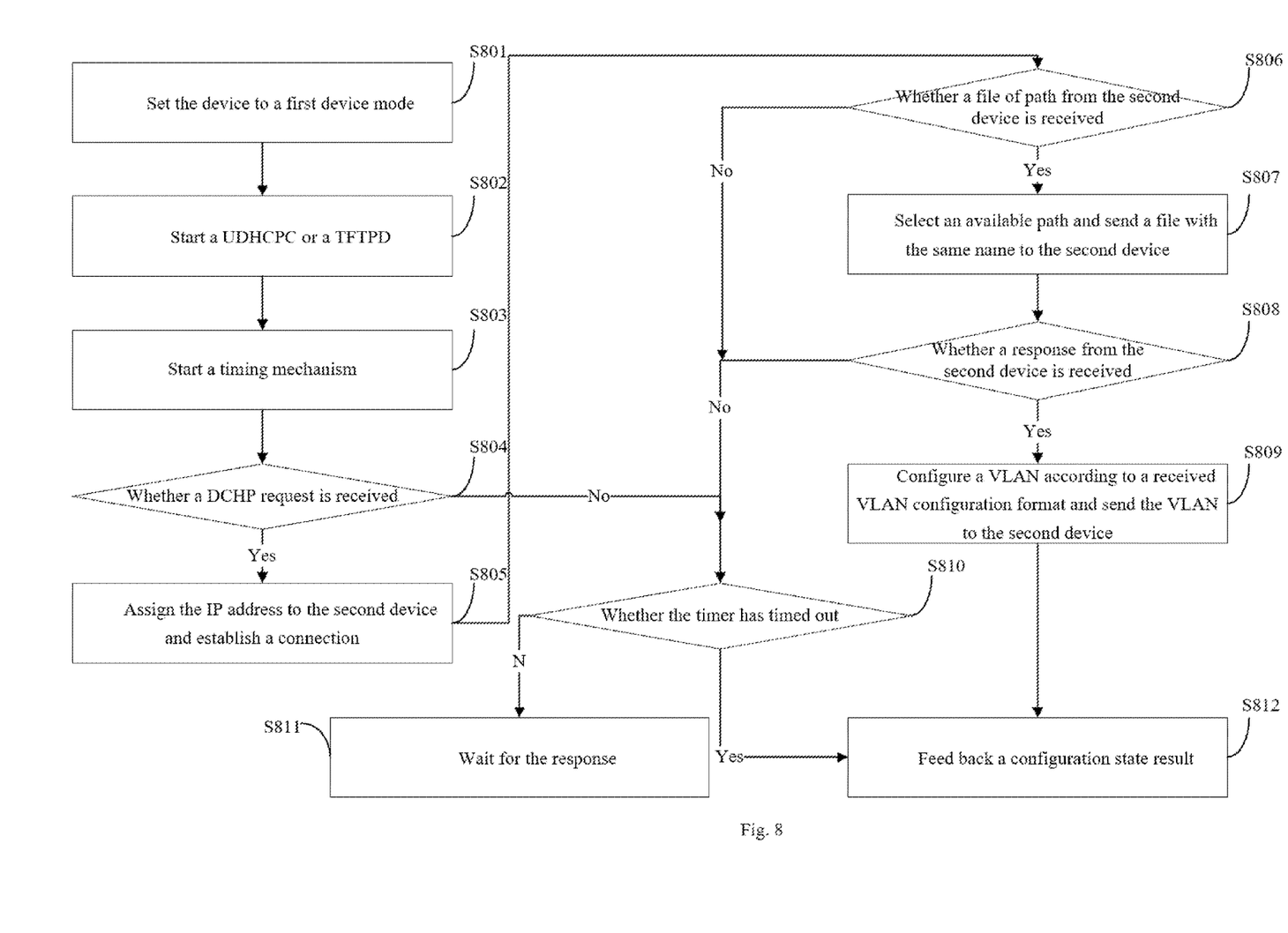
FIG. 8 is a flowchart showing operation of a first device provided by an embodiment of the present disclosure.

FIG. 8 is a flowchart showing operation of a first device provided by an embodiment of the present disclosure. The work flow of the second device shown in FIG. 8 includes at least the following steps: S801, setting the device to a first device mode; S802, starting a UDHCPC or a TFTPD; S803, starting a timing mechanism; S804, judging whether to acquire an IP address; S805, assigning the IP address to the second device and establishing a connection; S806, judging whether a file of path from the second device is received; S807, selecting an available path and sending a file with the same name to the second device; S808, judging whether a response from the second device is received; S809, configuring a VLAN according to a received VLAN configuration format and sending the same to the second device; S810, judging whether the timer has timed out; S811, waiting for the response; S812: feeding back a configuration state result.

At S801, the device is set to a first device mode.

In some embodiments, the device is set to a first device mode.

At S802, a UDHCPD or a TFTPD is started.

In some embodiments, the first device starts UDHCPD and TFTPD processes. The UDHCPD process is utilized for the communication connection established for assigning the IP address to the second device. An upstream access device selects a LAN port to be accessed by a downstream device in the UDHCPD process, and a downstream access device selects an upstream WAN port as a binding network card. The TFTPD process is utilized for file transfer.

At S803, a timing mechanism is started.

In some embodiments, a timing mechanism is started. The device is prevented from being in a waiting state under an abnormal condition. If the timer has timed out, information indicating VLAN information synchronization failure is fed back.

At S804, whether to acquire an IP address is judged.

In some embodiments, a judgement is made as to whether the first device receives a DHCP request message sent by the second device. After starting the UDHCPD process, the first device starts to monitor the DHCP request message of the access device. If the first device receives the DHCP request message sent by the second device, the process proceeds to S806; otherwise, the process proceeds to S805 to judge whether the timer has timed out, if not, a monitoring state is maintained.

At S805, an IP address is assigned to the second device and a connection is established.

In some embodiments, if detecting the DHCP request message sent by the second device, the first device sends a DHCP Offer message to the second device, and assigns an IP address to the second device. After the DHCP process is completed, a communication connection is established between the first device and the second device.

At S806, whether a file of path from the second device is received is judged.

In some embodiments, the first device judges whether a request of a first attempt of sending a file from the second device is received, if the request of a first attempt of sending a file from the second device is received, the process proceeds to S807; otherwise, the process proceeds to S811, and wait until the timer has timed out.

At S807, an available path is selected and a file with the same name is sent to the second device.

In some embodiments, after receiving the request of a first attempt of sending a file from the second device, the first device saves a writable path of this device in the file with the same name and pushes the file to a path corresponding to the request of a first attempt of sending a file from the second device.

At S808, whether a response from the second device is received is judged.

In some embodiments, the first device judges whether corresponding information from the second device is received, if so, the process proceeds to S809; otherwise, the process proceeds to S811.

At S809, a VLAN is configured according to a received VLAN configuration format and is sent to the second device.

In some embodiments, the first device parses the received VLAN configuration file information and format file; collects, according to a VLAN information collection mechanism, VLAN configuration information corresponding to a sending port of the second device; writes, according to a format required by the second device, the VLAN configuration information into the file with the same name and sends the VLAN configuration information to a corresponding directory of the second device.

At S810, whether the timer has timed out is judged.

In some embodiments, the first device judges whether the timer has timed out, if so, the process proceeds to S812.

At S811, the response is waited.

In some embodiments, response information fed back by the second device is waited.

At S812, a configuration state result is fed back.

In some embodiments, a configuration state result is fed back. If the file is successfully sent to the second device, a successful configuration is fed back; otherwise, a failed configuration is fed back.

Figure 9:
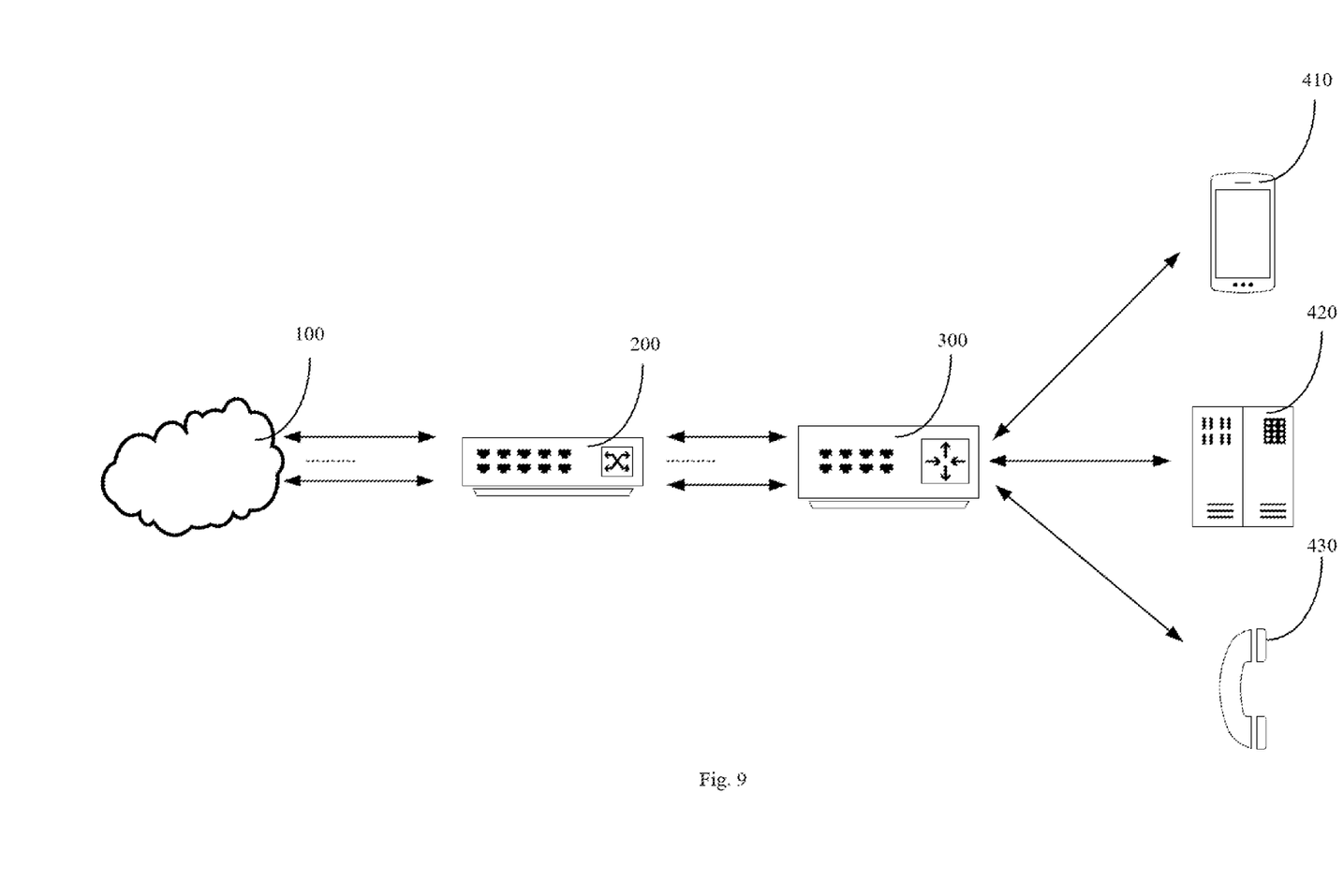
FIG. 9 is a schematic diagram of a network configuration architecture provided by an embodiment of the present disclosure.

FIG. 9 is a schematic diagram of a network configuration architecture provided by an embodiment of the present disclosure. The schematic diagram of the network configuration architecture shown in FIG. 9 includes: Internet 100, network access device 200, user access device 300, first access device 401, second access device 402 and third access device 403.

In some embodiments, multiple connections are established between the network access device 200 and the Internet 100 by means of multiple APNs or multiple wired access links. The network access device 200 and the user access device 300 are connected by means of a single physical link. On the physical link, by configuring the VLAN, multiple logical links are connected. The logical links correspond to the links established between the network access device 200 and the Internet 100. The user access device 300 is connected to access devices such as the first access device 401, the second access device 402 and the third access device 403. These devices may be terminal devices or functions. For example, the first access device 401 and the second access device 402 may adopt one data link for communication, while the third access device 403 may adopt another data link for communication.

In some embodiments, configuration of a VLAN of the network access device 200 or the user access device 300 is completed according to the VLAN configuration information, and a logical link of the VLAN is established between the network access device 200 and the user access device 300, thereby realizing multi-logical link communication based on a single physical link.

In some embodiments, an association between a user terminal device or service and a logical link may also be realized by establishing multiple data links between the network access device 200 and the Internet 100.

An embodiment of the present disclosure provides a communication terminal device communicatively connected to a second terminal device. The communication terminal device includes: an information acquisition module configured to acquire first configuration information of a VLAN; an information sending module configured to send the first configuration information to a second device; and a communication module configured to establish a communication connection with the second terminal device by means of an untagged interface.

An embodiment of the present disclosure provides a communication terminal device communicatively connected to a first terminal device. The communication terminal device includes: an information acquisition module configured to acquire first configuration information of a VLAN from the first terminal device; a network configuration module configured to set VLAN information according to the first configuration information and acquire second configuration information; and a communication module configured to establish a communication connection with the first terminal device by means of an untagged interface.

An embodiment of the present disclosure provides a computer-readable storage medium, for storing one or more programs which, when executed by one or more processors, cause the one or more processors to implement the above network configuration method.

According to the embodiment of the present disclosure, based on the VLAN, VLAN transmission between a master device and a slave device can be realized, and the slave device can adaptively configure the VLAN according to the information acquired from the master device, thus simplifying a network architecture of the VLAN and improving the stability of a system.

As will be understood by those having ordinary skills in the art that all or some of the steps, and systems in the method disclosed above may be implemented as software, firmware, hardware and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium, and the computer-readable medium may include a computer-readable storage medium (or a non-transitory medium) and a communication medium (or a transitory medium). As is well known to those having ordinary skills in the art, the term computer-readable storage medium includes volatile and nonvolatile, removable and non-removable media implemented in any method or technology for storing information such as computer-readable instructions, data structures, program modules or other data. A computer-readable storage medium may include RAM, ROM, EEPROM, flash memory or other memory technologies, CD-ROM, digital versatile disk (DVD) or other optical disk storage, magnetic cassette, magnetic tape, magnetic disk storage or other magnetic storage devices, or any other media that can be used to store desired information and can be accessed by a computer. In addition, it is well known to those having ordinary skills in the art that the communication medium may generally include computer-readable instructions, data structures, program modules or other data in a modulated data signal such as a carrier wave or other transmission mechanism, and may include any information delivery medium.

The above is a detailed description of some embodiments of the present disclosure, but the present disclosure is not limited thereto. Those having ordinary skills in the art can also make various equivalent modifications or substitutions without departing form the scope of the present disclosure, and these equivalent modifications or substitutions are included in the scope defined by the appended claims of the present disclosure.

What is claimed is:

1. A network configuration method for communicatively connecting a user access device to a network access device, the method comprising:
   receiving first configuration information from the network access device;
   adaptively setting Virtual Local Area Network (VLAN) information of the user access device according to the first configuration information, and generating second configuration information according to the VLAN information of the user access device; and
   establishing a logical link communication connection between the network access device and the user access device on a physical link by means of an untagged port according to the second configuration information, to share the physical link;
   wherein the network access device is connected to the Internet, and the user access device is connected to terminal devices or functions.

2. The network configuration method of claim 1, wherein the first configuration information comprises at least one of:
   VLAN ID, Internet Protocol (IP) subnet information, Access Point Name (APN) information or port type information.

3. The network configuration method of claim 1, wherein the user access device receives the first configuration information in a form of a Socket or a file.

4. The network configuration method of claim 1, further comprising:
   sending second configuration information to the network access device, wherein the second configuration information comprises at least one of: VLAN ID, IP subnet information or APN information.

5. A network configuration method for communicatively connecting a user access device to a firstnetwork access device, the method comprising:
   acquiring first configuration information of a Virtual Local Area Network (VLAN);
   sending the first configuration information to the user access device; and
   establishing a logical link communication connection between the user access device and the network access device on a physical link by means of an untagged interface according to the first configuration information, to share the physical link;
   wherein the network access device is connected to the Internet, and the user access device is connected to terminal devices or functions.

6. The network configuration method of claim 5, wherein the first configuration information comprises at least one of:
   VLAN ID, Internet Protocol (IP) subnet information, Access Point Name (APN) information or port type information.

7. The network configuration method of claim 6, further comprising:
   acquiring second configuration information from the user access device.

8. The network configuration method of claim 5, wherein the first configuration information is sent to the user access device by means of a mode comprising at least one of: sending a Socket or sending a file.

9. The network configuration method of claim 8, further comprising:
   acquiring second configuration information from the user access device.

10. The network configuration method of claim 5, further comprising:
    acquiring second configuration information from the user access device.

11. The network configuration method of claim 10, further comprising:
    detecting, according to the second configuration information, whether the first configuration information conflicts with the second configuration information; and
    in response to a presence of the confliction, performing a collision avoidance process.

12. The network configuration method of claim 11, wherein the collision avoidance process comprises:
    resetting a subnet address; and
    reconfiguring a subnet of the network access device.

13. A network configuration method for communicatively connecting a user access device to a network access device, the method comprising:
    acquiring, by the network access device, first configuration information of a Virtual Local Area Network (VLAN);
    sending, by the network access device, the first configuration information to the user access device;
    adaptively setting, by the user access device, VLAN information of the user access device according to the first configuration information;
    generating, by the user access device, second configuration information according to the VLAN information of the user access device;
    sending, by the user access device, the second configuration information to the network access device; and
    establishing, by the network access, a logical link communication connection between the network access device and the user access device on a physical link by means of an untagged port according to the first configuration information and the second configuration information, to share the physical link;
    wherein the network access device is connected to the Internet, and the user access device is connected to terminal devices or functions.

14. The network configuration method of claim 13, further comprising:
    performing a collision detection process, wherein the collision detection process at least comprises:
      sending, by the network access device, third configuration information to the user access device;
      acquiring, by the user access device, according to the third configuration information, a subnet and a gateway of the network access device;
      judging, by the user access device, whether the subnet and the gateway of the network access device are the same as the subnet and the gateway of the user access device;
      in response to the subnet and the gateway of the network access device being the same as the subnet and the gateway of the user access device, modifying the subnet and the gateway of the user access device; and
      in response to the subnet and the gateway of the network access device being different from the subnet and the gateway of the user access device, terminating the collision detection process.

15. The network configuration method of claim 13, further comprising:
- sending, by the user access device, an acquisition mode of the first configuration information to the network access device; and
- sending, by the network access device, the first configuration information to the user access device according to the acquisition mode.

16. The network configuration method of claim 15, wherein the acquisition mode comprises:
- sending the first configuration information in a form of a Socket or a file.

* * * * *